US011093460B2

(12) United States Patent
Tokuchi

(10) Patent No.: US 11,093,460 B2
(45) Date of Patent: Aug. 17, 2021

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 139 days.

(21) Appl. No.: 16/103,509

(22) Filed: Aug. 14, 2018

(65) Prior Publication Data

US 2019/0251181 A1 Aug. 15, 2019

(30) Foreign Application Priority Data

Feb. 14, 2018 (JP) .............................. JP2018-024061

(51) Int. Cl.
*G06F 16/00* (2019.01)
*G06F 16/21* (2019.01)

(52) U.S. Cl.
CPC .................................. *G06F 16/214* (2019.01)

(58) Field of Classification Search
CPC .............................. G06F 16/214; G06F 16/258
See application file for complete search history.

(56) References Cited

U.S. PATENT DOCUMENTS

| | | | | |
|---|---|---|---|---|
| 7,219,092 B2* | 5/2007 | Ikegaya | ................ | G06F 3/0616 |
| 7,904,426 B2* | 3/2011 | Ikegaya | ................ | G06F 3/0616 |
| | | | | 707/665 |
| 9,183,060 B2* | 11/2015 | Wakamiya | ............ | G06F 9/5077 |
| 9,619,170 B2* | 4/2017 | Hashimoto | ........... | G06F 3/0611 |
| 9,823,978 B2* | 11/2017 | Mutha | ................. | G06F 11/1461 |
| 9,854,056 B2* | 12/2017 | Kato | ...................... | H04L 63/101 |
| 10,152,697 B2* | 12/2018 | Hirahara | ................ | G06Q 10/20 |
| 10,198,451 B2* | 2/2019 | Prahlad | ............... | G06F 16/1727 |
| 10,949,382 B2* | 3/2021 | Hammer | ............... | G06F 16/156 |
| 2004/0049553 A1* | 3/2004 | Iwamura | ........... | H04L 29/12018 |
| | | | | 709/213 |
| 2004/0236797 A1* | 11/2004 | Ikegaya | ................ | G06F 3/0689 |
| 2007/0130234 A1* | 6/2007 | Ikegaya | ................ | G06F 3/0689 |
| 2008/0010325 A1* | 1/2008 | Yamakawa | ........... | G06F 3/0647 |
| 2009/0222413 A1* | 9/2009 | Mattox | ................. | G06F 16/214 |
| 2013/0041977 A1* | 2/2013 | Wakamiya | ............ | G06F 9/5077 |
| | | | | 709/217 |
| 2014/0337471 A1* | 11/2014 | Yasuda | ................. | G06F 9/5072 |
| | | | | 709/217 |
| 2015/0106060 A1* | 4/2015 | Hirahara | ................ | G06Q 10/20 |
| | | | | 702/188 |
| 2015/0304446 A1* | 10/2015 | Kato | ................... | H04L 67/2842 |
| | | | | 709/223 |
| 2018/0152505 A1* | 5/2018 | Averett | ............... | H04L 67/1097 |

FOREIGN PATENT DOCUMENTS

JP 2015-212901 A 11/2015

* cited by examiner

*Primary Examiner* — Jean M Corrielus
(74) *Attorney, Agent, or Firm* — Oliff PLC

(57) ABSTRACT

An information processing apparatus includes a receiving unit and an output unit. The receiving unit receives a data migration request submitted to a current administrator of data associated with a user. In accordance with the data migration request, the output unit outputs data that to be migrated and that is information acceptable to a new administrator serving as a data migration destination.

20 Claims, 14 Drawing Sheets

FIG. 4

◇ Data-Migration Request Screen

● Account Information
ID: 76888
Password: ****
Name: AAAA AAAA

● Migration Destination Information
Company name: AA Co.
Service name: BB service
Desirable output format: csv ● Desired Data Items:  [Select All]
☐ Login history          ☐ Deposit information
☐ Withdrawal information ☐ Purchase history
☐ MAC address in login
☐ Positional information in login
☐ Browser information in login
☐ Print history          ☐ Storage history
☐ Update history         ☐ Contact list
☐ Transmission history   ☐ Reception history

[Next]

FIG. 11

◇ Data-Migration Request Screen

● Migration Destination Information
Company name: AA Co.
Service name: BB service
Desirable output format: csv ● Desired Data Items:                    [ Select All ]
☐ Login history            ☐ Deposit information
☐ Withdrawal information   ☐ Purchase history
☐ MAC address in login
☐ Positional information in login
☐ Browser information in login
☐ Print history            ☐ Storage history
☐ Update history           ☐ Contact list
☐ Transmission history     ☐ Reception history ● Account Information
◇ Account Information 1
ID: 11113
Password: ****
Name: BBBB BBBB ◇ Account Information 2
ID: 11118
Password: ****
Name: AAAA AAAA ◇ Account Information 3
ID: 11125
Password: ****
Name: CCCC CCCC

．
．
．

[ Next ]

FIG. 15

◇ Data-Migration Request Screen

● Account Information
ID: 12345
Password: ****
Name: AAAA AAAA

● Migration Source Information
Migration source company name: XX Co.
Service name: YY service
Account ID: 76888
Password: ****
File: ZZ.csv ● Desired Data Items:      [ Select All ]
☐ Login history     ☐ Deposit information
☐ Withdrawal information     ☐ Purchase history
☐ MAC address in login
☐ Positional information in login
☐ Browser information in login
☐ Print history     ☐ Storage history
☐ Update history     ☐ Contact list
☐ Transmission history     ☐ Reception history

[ Next ]

FIG. 16

◇ Progress Display Screen

Checking the data...
Wait for a moment.

It takes about 10 minutes.

FIG. 17

◇ First Warning Screen

○ The obtained data includes another person's personal information.
○ Select one of the following options.
  ☐ Reset the data items
  ☐ Delete the item data automatically, and continue the data migration

FIG. 18

◇ Second Warning Screen

○ The obtained data includes item data failing to be stored.
○ Select one of the following options.
  ☐ Reset the data items
  ☐ Delete the item data automatically, and continue the data migration

FIG. 19

◇ Data-Migration Request Screen

● Migration Source Information
Migration source company name: XX Co.
Service name: YY service ● Desired Data Items:　　　　　　　　　　　[ Select All ]
☐ Login history　　　　☐ Deposit information
☐ Withdrawal information　☐ Purchase history
☐ MAC address in login
☐ Positional information in login
☐ Browser information in login
☐ Print history　　　　☐ Storage history
☐ Update history　　　☐ Contact list
☐ Transmission history　☐ Reception history ☆ User 1
● Account Information
ID: 12345
Password: ****
Name: AAAA AAAA
● Migration Source Account Information
Account ID: 76888
Password: ****
File: ZZ.csv ☆ User 2
● Account Information
ID: 12346
Password: ****
Name: DDDD DDDD
● Migration Source Account Information
Account ID: 76889
Password: ****
File: WW.csv
　·
　·
　·

[ Next ]

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-024061 filed Feb. 14, 2018.

BACKGROUND

(i) Technical Field

The present invention relates to an information processing apparatus, an information processing system, and a non-transitory computer readable medium.

(ii) Related Art

Internet of things (IoT) has come into wider use in the society, and the value of personal data including private information of a user has increased. There arises an issue in that a company which exclusively uses the personal data is superior in the market.

Therefore, a mechanism has been studied in which a user easily carries out their personal data from a company in order that smooth open competition is promoted to reduce occurrence of the state in which a specific company managing personal data controls the market.

SUMMARY

According to an aspect of the invention, there is provided an information processing apparatus including a receiving unit and an output unit. The receiving unit receives a data migration request submitted to a current administrator of data associated with a user. In accordance with the data migration request, the output unit outputs data that to be migrated and that is information acceptable to a new administrator serving as a data migration destination.

BRIEF DESCRIPTION OF THE DRAWINGS

Exemplary embodiments of the present invention will be described in detail based on the following figures, wherein:

FIG. 4 is a diagram illustrating an exemplary data-migration request screen according to the first exemplary embodiment;

FIG. 11 is a diagram illustrating another exemplary data-migration request screen according to the first exemplary embodiment;

FIG. 15 is a diagram illustrating an exemplary data-migration request screen according to the second exemplary embodiment;

FIG. 16 is a diagram illustrating an exemplary progress display screen according to the second exemplary embodiment;

FIG. 17 is a diagram illustrating an exemplary first warning screen according to the second exemplary embodiment;

FIG. 18 is a diagram illustrating an exemplary second warning screen according to the second exemplary embodiment; and FIG. 19 is a diagram illustrating another exemplary data-migration request screen according to the second exemplary embodiment.

DETAILED DESCRIPTION

Desirable exemplary embodiments of the present invention will be described below on the basis of the drawings.

First Exemplary Embodiment

Figure 1:
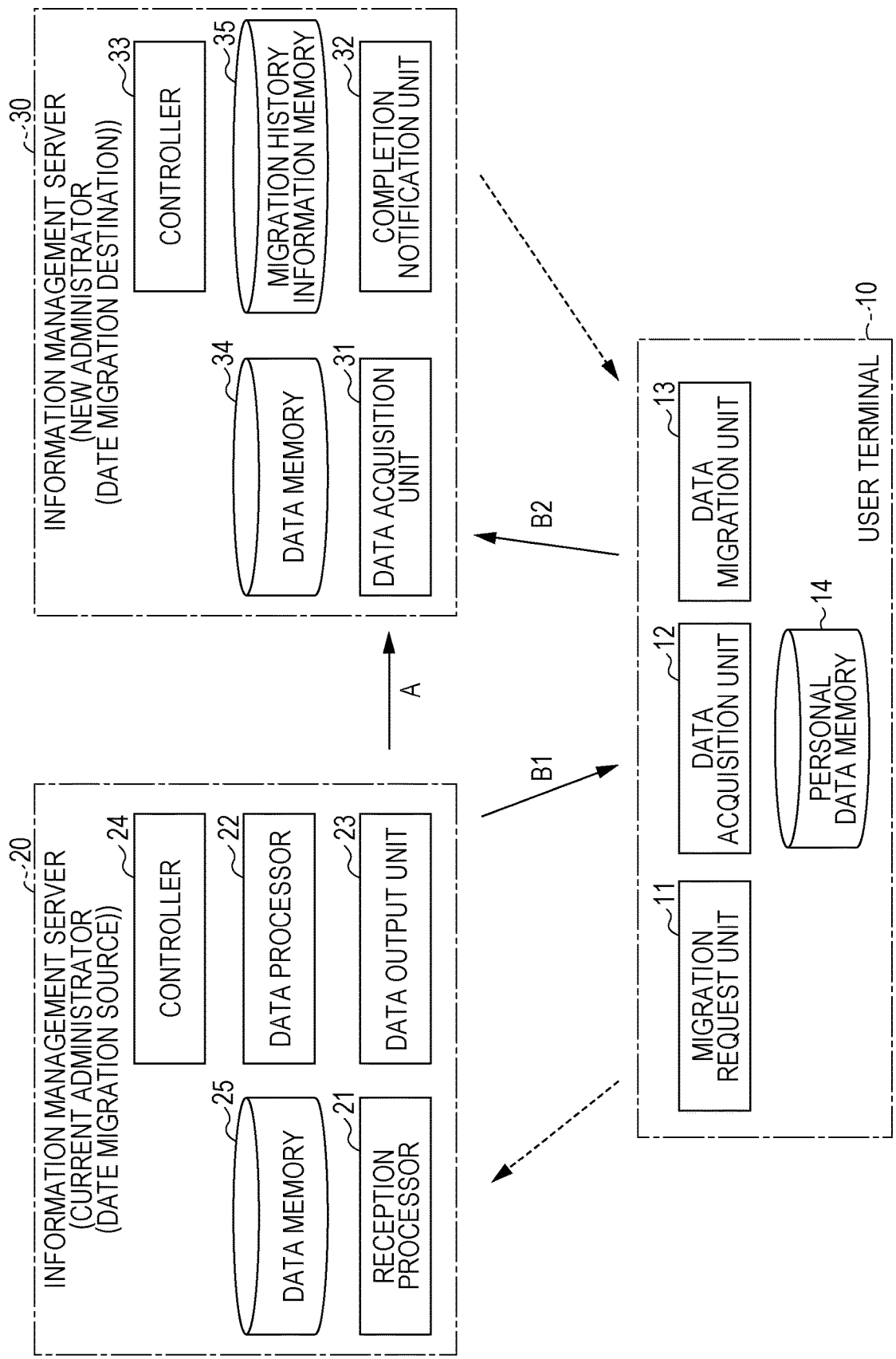
FIG. 1 is a diagram illustrating the overall block configuration of an information processing system according to an exemplary embodiment of the present invention.

FIG. 1 is a diagram illustrating the overall block configuration of an information processing system according to an exemplary embodiment of the present invention. FIG. 1 illustrates a user terminal 10 and two information management servers 20 and 30 which are communicatively connected to each other over a network (not illustrated).

The user terminal 10 is a terminal apparatus formed by using an information processing apparatus such as general-purpose personal computer (PC). That is, the user terminal 10 includes a central processing unit (CPU) and memories, such as a read-only memory (ROM), a random-access memory (RAM), and a hard disk drive (HDD). The user terminal 10 also includes input units, such as a mouse and a keyboard, and a display unit such as a display, or a user interface such as a liquid-crystal panel serving as an input unit and a display unit. The user terminal 10 also includes a network interface serving as a communication unit. A user using the user terminal 10 offers their personal data to an administrator. The personal data is managed in the information management server 20 or 30 used by the administrator. The personal data includes the user's private information, such as their address, their name, their birth date, their mail address, their profile photograph, for example, a photograph of their face, their hobbies, and their payment information, for example, their credit card information. The personal data includes information offered by the user. As a matter of course, the personal data is not limited to these. In addition to these, information other than the information offered by the user themselves, such as history information generated in accordance with the user's action, for example, their login history, their purchase records, their deposit information, and their withdrawal information, may be included. In the description below, the personal data is simply referred to as "data".

Each of the information management servers 20 and 30 is formed by using a server computer used for data management by a business operator (a company or an individual) which stores and manages the above-described data. That is, each of the information management servers 20 and 30 includes a CPU, memories, such as a ROM, a RAM, and an HDD, and a network interface serving as a communication unit. In addition to these, each of the information management servers 20 and 30 may include a user interface used by an administrator or an operator, when necessary.

As described below, in the first exemplary embodiment, a user's data is managed by the information management server 20 of a business operator (hereinafter also referred to as a "current administrator") which currently manages the data offered by the user. The following case will be described as an example. The data is migrated from the information management server 20, which serves as a migration source, to the information management server 30, which serves as a migration destination. Thus, the data is managed by a business operator (hereinafter also referred to as a "new administrator") using the information management server 30. The user has right to obtain their own data from the current administrator in an easily-handled electronic format, and right to migrate their own data from the current administrator to a new administrator (the right to data portability described in Article 20, the General Data Protection Regulation (GDPR)).

The user terminal 10 includes a migration request unit 11, a data acquisition unit 12, a data migration unit 13, and a personal data memory 14. Components which are not used in the description of the first exemplary embodiment are omitted from FIG. 1. The migration request unit 11 requests the information management server 20 to perform data migration. In the first exemplary embodiment, the data is migrated from the information management server 20 serving as the current administrator to the information management server 30 serving as a new administrator. In the migration, there are two routes: from the information management server 20 directly to the information management server 30; and via the user terminal 10. In the case of the latter route, when a backup of the data is to remain in the user terminal 10, the data acquisition unit 12 obtains the data from the information management server 20, and registers the data in the personal data memory 14. In the case of the latter route, the data migration unit 13 retrieves the data from the personal data memory 14, and transmits the data to the information management server 30. Thus, the data migration is completed.

The components 11 to 13 in the user terminal 10 are implemented through collaboration between a computer, which constitutes the user terminal 10, and programs, which are executed by the CPU installed in the computer. The personal data memory 14 is implemented by using an HDD installed in the user terminal 10. Alternatively, a RAM may be used, or a memory which is present outside may be used over a network.

The information management server 20 owned by the current administrator includes a reception processor 21, a data processor 22, a data output unit 23, a controller 24, and a data memory 25. Components which are not used in the description in the first exemplary embodiment are omitted from FIG. 1. The reception processor 21 receives a data migration request from the user terminal 10 used by a user who wants to migrate the data. In the data memory 25, one or more pieces of the user's data to be managed are registered. When the data registered in the data memory 25 is to be migrated to the information management server 30 in accordance with a data migration request from the user, the data processor 22 performs data processing, such as selection of data to be migrated and conversion into a data output format. Thus, the data processor 22 generates data having information which is acceptable to the new administrator serving as the data migration destination and which is desired by the user. The data output unit 23 outputs the data generated by the data processor 22. The output destination is at least one of the information management server 30 and the user terminal 10 in accordance with the request from the user. The controller 24 collaborating with the other components 21 to 23 controls, as the data migration source, execution of a data migration process described below.

The components 21 to 24 in the information management server 20 are implemented through collaboration between the computer, which constitutes the information management server 20, and programs, which are executed by the CPU installed in the computer. The data memory 25 is implemented by using the HDD installed in the information management server 20. Alternatively, the RAM may be used, or a memory which is present outside may be used over a network.

The information management server 30 owned by the new administrator includes a data acquisition unit 31, a completion notification unit 32, a controller 33, a data memory 34, and a migration history information memory 35. Components which are not used in the description of the first exemplary embodiment are omitted from FIG. 1. The data acquisition unit 31 obtains migration target data from the information management server 20 or the user terminal 10, and registers the data in the data memory 34. The completion notification unit 32 notifies the user of completion of data migration from the administrator. The controller 33 collaborating with the other components 31 and 32 controls, as the data migration destination, execution of a data migration process described below. In the data memory 34, data to be managed is stored. As described below in detail, data migration is performed between the information management servers 20 and 30. The migration history information memory 35 accumulates information about the data migrations, as migration history information.

The components 31 to 33 in the information management server 30 are implemented through collaboration between the computer, which constitutes the information management server 30, and programs, which are executed by the CPU installed in the computer. The data memory 34 and the migration history information memory 35 are implemented by using the HDD installed in the information management server 30. Alternatively, the RAM may be used, or a memory which is present outside may be used over a network.

The programs used in the first exemplary embodiment may be provided not only through a communication unit but also by storing the programs in a computer-readable recording medium, such as a compact disc-read-only memory (CD-ROM) or a Universal Serial Bus (USB) memory. The programs provided through the communication unit or a recording medium are installed in a computer whose CPU executes the programs sequentially, achieving the various processes.

In the first exemplary embodiment, for convenience of description, the information management server 20 which is a first information processing apparatus owned by the current administrator is specified as a migration source; and the information management server 30 which is a second information processing apparatus owned by the new administrator is specified as a migration destination. However, when another user's data is migrated to the information management server 20, the information management server 20 serves as a server owned by the new administrator. When the information management server 30 has already stored and managed another user's data, the information management server 30 serves as a server owned by the current administrator. Therefore, actually, the information management server 20 includes the components of the information management server 30 illustrated in FIG. 1. The information management server 30 includes the components of the information management server 20 illustrated in FIG. 1.

Figure 2:
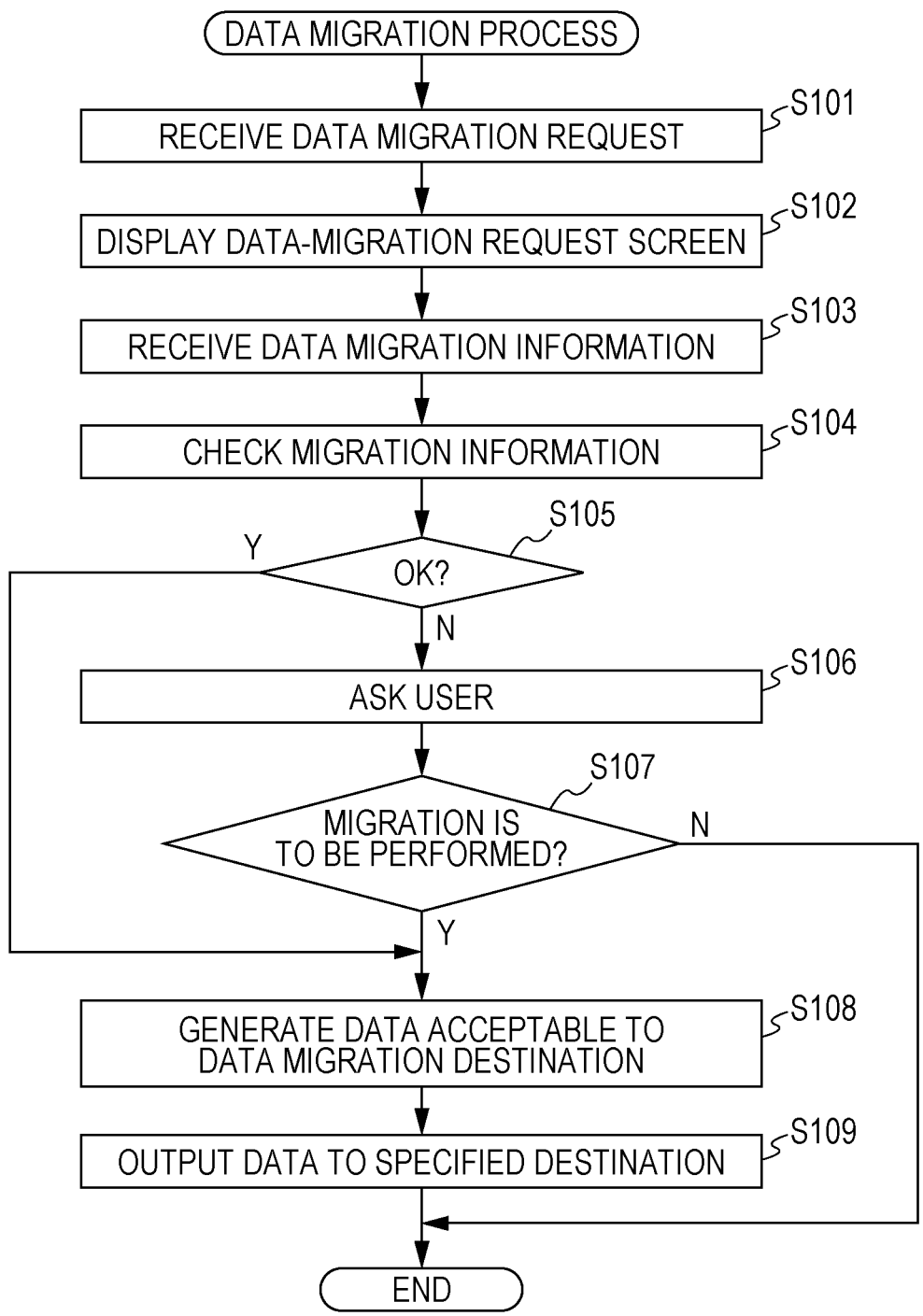
FIG. 2 is a flowchart of a data migration process performed by an information management server serving as a data migration source, according to a first exemplary embodiment.

Operations according to the first exemplary embodiment will be described. The data migration process performed by the information management server 20 serving as the data migration source will be described by using the flowchart illustrated in FIG. 2.

A user who wants to migrate their data logs in to the information management server 20 of the current administrator which manages the user's data. Through the login or execution of a given operation after the login, the current administrator is requested to perform data migration.

Figure 3:
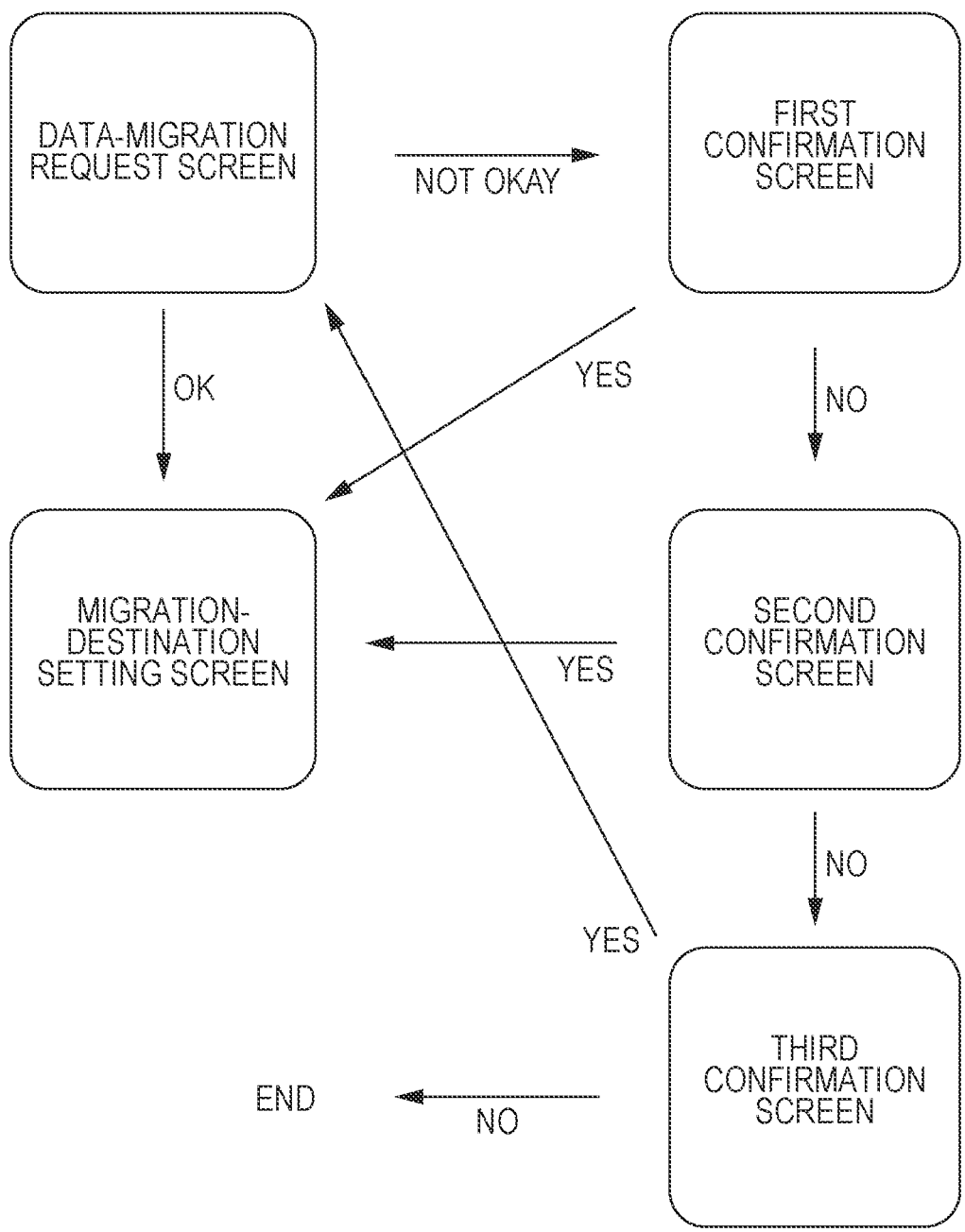
FIG. 3 is a diagram illustrating the transition relationship between screens displayed on a user terminal, according to the first exemplary embodiment.

When the reception processor 21 of the information management server 20 receives a data migration request from the user terminal 10 (step 101), the reception processor 21 causes the user terminal 10 to display a data-migration request screen illustrated in FIG. 4 (step 102). More specifically, the browser of the user terminal 10 processes a web page prepared by the information management server 20. Thus, the data-migration request screen is displayed. The same is true for screens other than the data-migration request screen. In the first exemplary embodiment, the display is switched from the data-migration request screen to several screens in a series in accordance with user operations. FIG. 3 illustrates the transition relationship between the screens which are switched from one to another.

The user sets, on the data-migration request screen, information for specifying a new administrator and information for specifying data acceptable to the new administrator. On the data-migration request screen in FIG. 4, account information, migration destination information, and data information (desired data items) are displayed exemplarily. The account information includes information about the user which is specified when the user logs in to the information management server 20 (information for specifying the user who wants to perform data migration). In the display example in FIG. 4, the account ID and the password (which may be hidden), which are specified in the login, and the user name are displayed.

The migration destination information includes information about the data migration destination. In the display example in FIG. 4, a company name is displayed as information for specifying the data migration destination (new administrator); the name of a service to be used is displayed as information for specifying a service using the data in the company; and a data output format in which the data to be used in the service is offered to the data migration destination is displayed. The user specifies the migration destination information. Thus, the data format acceptable to the new administrator is specified. As a matter of course, it is not necessary for the user to input all of the migration destination information. For example, when the user inputs and specifies the company name, a list of services provided by the company may be displayed in a pull-down menu or the like, and the user may select one of the services. When the company name and the service name are determined, the desired output format may be automatically selected. Information about the services provided by each company and the data formats used in each service may be managed by the information management server 20 itself. Alternatively, for example, a shared database may be created in the information processing system. Each business operator (administrator) registers, in advance in the shared database, an association between the administrator and a data format appropriate for the administrator. When the administrator provides multiple services, the administrator registers, in advance in the shared database, an association between each service provided by the administrator and a data format appropriate for the service. Thus, a shared database may be provided in the system. The shared database may be accessed to obtain the services of the data migration destination and the data output formats appropriate for the services.

The names of data items included in the data managed by the current administrator are displayed as the data information in a selectable manner. The user specifies, among the data items, data items that are to be migrated to the new administrator. In the first exemplary embodiment, the user checks checkboxes to select item data that is to be migrated. Alternatively, another selection method may be used to select items that are to be migrated. The user selects, from the item list, items corresponding to the item data that is to be migrated to the new administrator.

The data items illustrated in FIG. 4 are exemplary, and are not necessarily limiting. For example, when the information management server 20 provides a service to a user by using a multifunction device provided with a print function, a fax function, a copy function, and the like, the data information may include items, such as the user's print history, the user's print image data, the user's fax transmission history, the user's fax data, the user's scan history, the user's scan data, and the user's address book. Thus, the data items included in the data information may depend on the service provided by the current administrator by using the information management server 20.

When the user does not specify the migration destination information, the user may be asked about the migration destination, or it may be recognized that this indicates that the user terminal 10 is specified as data transmission destination of the data output unit 23.

After the user specifies necessary information, when the user selects the "Next" button on the data-migration request screen, the reception processor 21 receives, from the data-migration request screen, information specified by the user (step 103). According to the received information, the data processor 22 obtains, from the data memory 25, item data corresponding to the items specified in the user's data information, that is, item data that is to be migrated. The data processor 22 checks the obtained item data preliminarily before data output (step 104).

For example, information (such as a photograph of other people's faces) about persons other than the user, such as a group photograph, may be included in the item data that is to be migrated. In another example, another person's personal data such as the person's mail address may be included. It is determined whether or not the item data includes information other than information registered in the user's private information (in this example, the mail address). The determination result may indicate whether the item data is the user's information or another person's information. Thus, there is information which, even though being included in the user's information, is associated also with another person other than the user, that is, which corresponds to another person's private information. Migration of the user's migration target data including such information to an administrator (that is, the new administrator) different from the current administrator may be inappropriate in terms of data handling. Therefore, the data processor 22 preliminarily checks the item data, which is to be migrated, and determines whether or not information that is inappropriate for data migration is included.

If the preliminary check result indicates that data migration without measures taken against item data may be inappropriate (N in step 105), in the first exemplary embodiment, the measures are taken by asking the user as described below (step 106).

Figure 5:
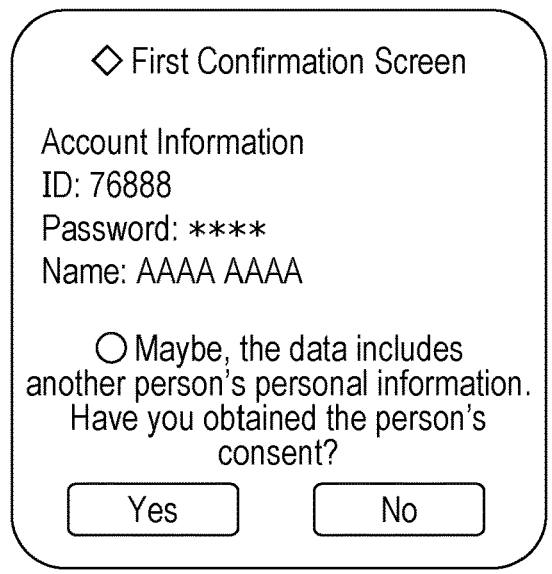
FIG. 5 is a diagram illustrating an exemplary first confirmation screen according to the first exemplary embodiment.
Figure 6:
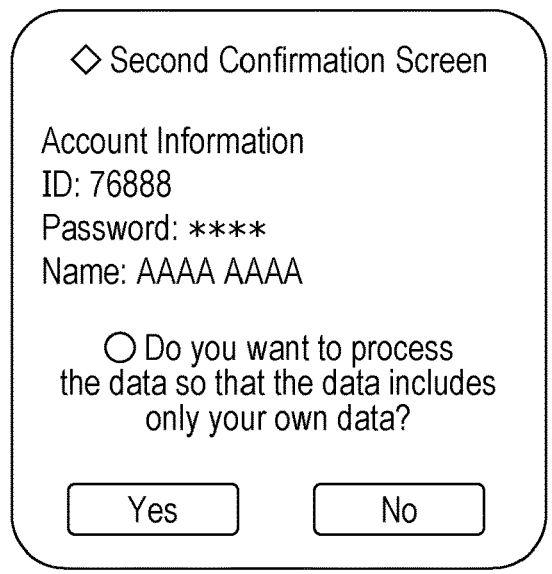
FIG. 6 is a diagram illustrating an exemplary second confirmation screen according to the first exemplary embodiment.
Figure 7:
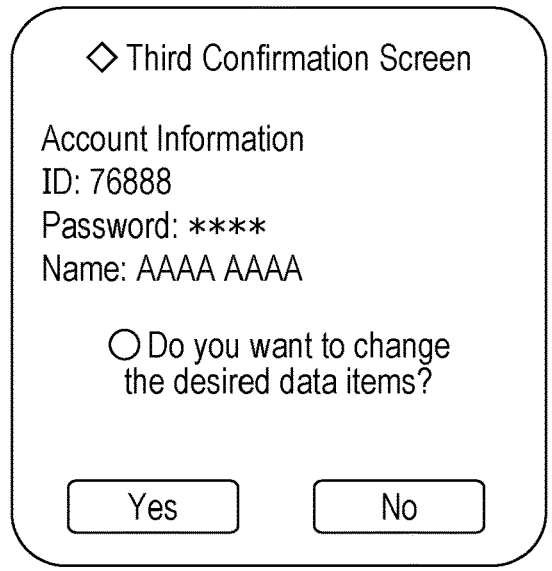
FIG. 7 is a diagram illustrating an exemplary third confirmation screen according to the first exemplary embodiment.

When the data to be migrated includes item data associated with another person, the reception processor 21 causes the user terminal 10 to display a first confirmation screen illustrated in FIG. 5 so that the user is asked about whether or not the user has obtained, from the person, the person's consent to migration of data, which includes item data associated with the person, to a different administrator. When the person's consent has been obtained, the user selects the "Yes" button on the first confirmation screen. Thus, the reception processor 21 causes the user terminal 10 to display a migration-destination setting screen. When the "No" button is selected, the reception processor 21 causes the user terminal 10 to display a second confirmation screen illustrated in FIG. 6. Thus, the user is asked about whether or not the item data is allowed to be processed so that the person's private information is deleted. When the processing is allowed, the user selects the "Yes" button on the second confirmation screen. Thus, the data processor 22 processes the data so that the person's private information is deleted from the item data. Then, the reception processor 21 causes the user terminal 10 to display the migration-destination setting screen. When the "No" button is selected, the reception processor 21 causes the user terminal 10 to display a third confirmation screen illustrated in FIG. 7. Thus, the user is asked about whether or not the desired data items (data information) are to be changed. When the desired data items are to be changed, the user selects the "Yes" button on the third confirmation screen. Thus, the reception processor 21 causes the user terminal 10 to display the data-migration request screen illustrated in FIG. 4. After that, the user sets again the data information on the data-migration request screen. In FIGS. 5 to 7, inappropriate data items or item data in such data items are not presented to the user, but may be presented to the user. If it is determined that migration of the data including item data of the data items desired by the user is not allowed because the "No" button is also selected on the third confirmation screen (N in step 107), the reception processor 21 does not accept and rejects the data migration request from the user.

If it is determined that data migration is allowed because the data to be migrated does not include inappropriate item data (Y in step 107), the data processor 22 converts the data into the output format specified as the desired output format in the migration destination information (step 108). That is, when the information management server 20 stores the data in an output format different from the desired output format, the migration target data is converted into the desired output format so that the data is in a format appropriate for the new administrator. In contrast, when the information management server 20 stores the data in the same output format as the desired output format, the information management server 20 stores the data as information acceptable to the information management server 30. Accordingly, the data is not necessarily converted, and may be transmitted as the migration target data as it is.

The reception processor 21 causes the user terminal 10 to display the migration-destination setting screen. If it is determined that data migration is allowed based on the preliminary check result of the item data that is to be migrated (Y in step 105), the migration-destination setting screen is also displayed on the user terminal 10. The user makes final settings on the migration-destination setting screen as described below.

When the user selects the "Yes" button for "Store the data in your terminal?" the migration target data is transmitted to the user terminal 10. When the user wants to perform data migration via the user terminal 10, or when the user wants to store a backup of the data in the user terminal 10, the user selects the "Yes" button. In contrast, when the user selects the "No" button, the migration target data is not transmitted to the user terminal 10.

When the user selects the "Yes" button for "Migrate the data to the migration destination?" the migration target data is transmitted directly to the information management server 30. In contrast, when the user selects the "No" button, the migration target data is not transmitted to the information management server 30. When the user selects the "No" button, the user needs to have selected the "Yes" button for "Store the data in your terminal?" When the user selects the "No" button for both the questions, data migration is not performed. Therefore, to avoid this, when the user selects the "No" button for both the questions, it is desirable to take measures, such as display of an alert message.

The user's specification of a data migration destination on the data-migration request screen may indicate that the migration target data is to be transmitted directly to the information management server 30. However, in the first exemplary embodiment, the migration-destination setting screen is used to check, again with the user, whether or not the data is to be transmitted directly.

When the user selects the "Yes" button for "Delete the data from the migration source?" the user's data is deleted from the data memory 25 of the information management server 20 after successful termination of the data migration. In contrast, when the user selects the "No" button, the user's data is not deleted in the information management server 20 so as to remain. That is, although the item data may not be the same, the user's data is present in both of the information management server 20 and the information management server 30. In this case, the administrator of the information management server 20 remains as the current administrator. After completion of the data migration, the administrator (new administrator) of the information management server 30 becomes the current administrator.

When the information management server 20 accepts a data migration request from the user, the data output unit 23 transmits the migration target data to the destination specified on the migration-destination setting screen (step 109).

That is, when the user selects storage of the data in the user terminal 10 on the migration-destination setting screen, the data output unit 23 transmits the data to the user terminal 10 as illustrated by using arrow B1 in FIG. 1. When the user selects data migration to the migration destination on the migration-destination setting screen, the data output unit 23 transmits the data directly to the information management server 30 as illustrated by using arrow A in FIG. 1.

When the user terminal 10 receives the data from the information management server 20, the data acquisition unit 12 obtains the data and stores the data in the personal data memory 14. When the user selects the "No" button for "Migrate data to the migration destination?" the data migration unit 13 transmits the data, which is stored in the personal data memory 14, to the information management server 30 as illustrated by using arrow B2 in FIG. 1, in accordance with the instruction from the user.

When the data acquisition unit 31 of the information management server 30 obtains the data directly from the information management server 20 or via the user terminal 10, the data acquisition unit 31 stores the data in the data memory 34. When the data acquisition unit 31 obtains the migration target data, the data acquisition unit 31 registers track record information about the data migration, as the migration history information in the migration history information memory 35. For example, in the migration history information, the following pieces of data are stored in association with one another: date-and-time information indicating the date and time when the data migration is completed; information for identifying the user corresponding to the migrated data, such as account information; information for specifying migrated data items, such as data information; and information for specifying the data migration source, such as information about the administrator of the migration source or information for specifying the information management server 20.

Figure 9:
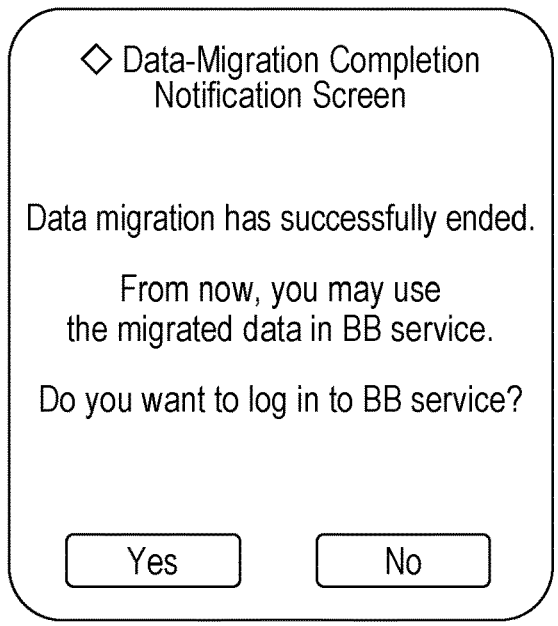
FIG. 9 is a diagram illustrating an exemplary data-migration completion notification screen according to the first exemplary embodiment.

Thus, migration of the user's data is completed. When the data migration is completed, the completion notification unit 32 causes the user terminal 10 to display a data-migration completion notification screen illustrated in FIG. 9 to notify the user of successful termination of the data migration.

Figure 10:
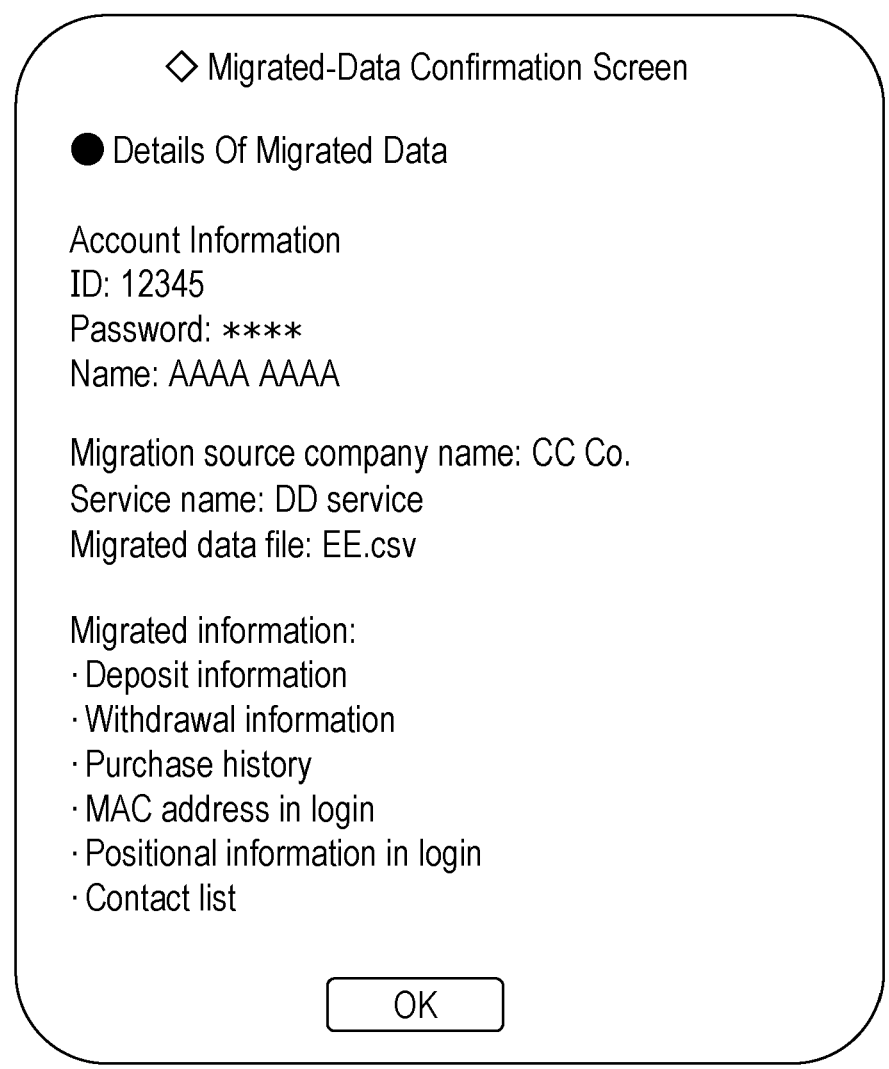
FIG. 10 is a diagram illustrating an exemplary migrated-data confirmation screen according to the first exemplary embodiment.

After that, when the user selects the "Yes" button on the data-migration completion notification screen and logs in to the information management server 30, the completion notification unit 32 causes the user terminal 10 to display, under the control of the controller 33, a migrated-data confirmation screen illustrated in FIG. 10. The user may refer to the migrated-data confirmation screen so as to check the migrated data items. On the exemplary migrated-data confirmation screen illustrated in FIG. 10, a list of data items included in the migrated data is displayed as information about the migrated data. The item data may be displayed instead of the data items or together with the data items so that the user checks the data.

In completion of the data migration, the completion notification unit 32 may also notify the information management server 20, which serves as the data migration source, that the data migration is completed. When the user has instructed, on the migration-destination setting screen illustrated in FIG. 8, that the migrated data is to be deleted, the information management server 20 having received the notification deletes the data from the data memory 25.

When the data acquisition unit 31 of the information management server 30, which serves as the migration destination, completes acquisition of the data, the user may receive the final confirmation before storage of the data in the data memory 34. This is because, although the user has logged in to the information management server 20 which serves as the migration source, when the data is transmitted from the information management server 20 directly to the information management server 30, the validity of the user is not confirmed because the user has not logged in to the information management server 30 which serves as the migration destination. Therefore, for example, when the data is transmitted directly from the information management server 20, the data acquisition unit 31 functions as an inquiry unit, and asks the user by causing the user terminal 10 to display an inquiry screen about whether or not the migration target data has been transmitted from the migration source company on the basis of the user's request. An account of the user has been created in the information management server 30, and the account information has been already registered. Therefore, the data acquisition unit 31 issues a temporary password to the notification destination (such as the mail address) included in the account information. The user inputs the temporary password on the inquiry screen described above so that the validity of the user is confirmed. When the validity of the user is confirmed, the data acquisition unit 31 may register the migration target data in the data memory 34 at that time point, causing the migration process to be completed.

Repetition of the data migration process described above may decrease the number of data items that are to be migrated, depending on the user's specification of data information on the data-migration request screen. Therefore, the case in which a data item which the new administrator wants to obtain is lost from the migration target data may occur. Accordingly, the information management server 30 serving as the new administrator may have a function of causing the user to input item data so that the lost data item may be recovered. The recovered data is added to the data and is registered in the data memory 34.

As described above, a person's data may be migrated. For example, the case in which employees' data stored in the information management server 20 serving as a current administrator is to be collectively migrated to a new administrator may occur. In the first exemplary embodiment, such a case may be conveniently addressed.

FIG. 11 is a diagram illustrating another exemplary data-migration request screen according to the first exemplary embodiment. As is clear from the comparison with the data-migration request screen illustrated in FIG. 4, the data-migration request screen illustrated in FIG. 11 allows account information of multiple users to be collectively set on the data-migration request screen. That is, the user causes the user terminal 10 to display the data-migration request screen, which is illustrated in FIG. 11, for migration for multiple users. The user specifies, on this screen, migration destination information and data information which are common to the multiple users, and specifies the account information of the multiple users whose data is collectively migrated.

Thus, in the first exemplary embodiment, a user may specify information about multiple users on a single screen so that data for the multiple users is collectively migrated. The data migration process for each user may be the same as the process described above. Data migrated to the information management server 30 may be handled by the user who owns the data, or may be handled only by the user who has performed the data migration (or, for example, an administrator who has given the instruction to the user).

The data-migration request screen illustrated in FIG. 11 is an exemplary screen used when multiple users' data is collectively migrated to the same migration destination.

Alternatively, corresponding new administrators which serve as the migration destinations of data associated with the respective multiple users may be set separately for the users.

In the above description, migration target data is limited to personal data, but is not necessarily limited to personal data. Data desired by a user may be migrated.

Second Exemplary Embodiment

In the first exemplary embodiment, a user requests data migration from the current administrator. In a second exemplary embodiment, a user requests data migration from the new administrator, and the information management server 30 serving as the new administrator responds to the data migration request from the user.

Figure 12:
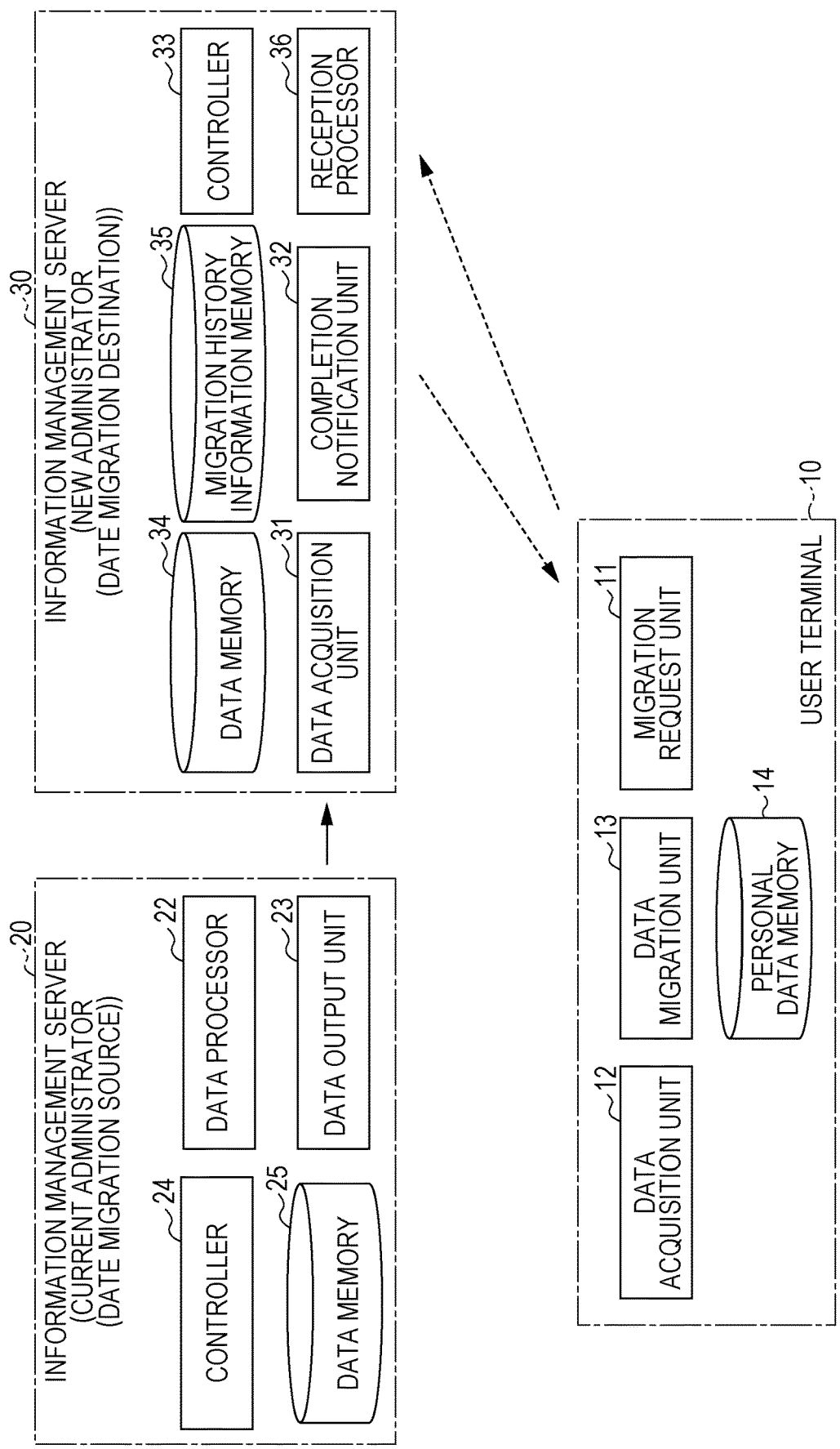
FIG. 12 is a diagram illustrating the overall block configuration of an information processing system according to a second exemplary embodiment.

FIG. 12 is a diagram illustrating the overall block configuration of an information processing system according to the second exemplary embodiment. Components identical to those in FIG. 1 are designated with identical reference numerals, and will not be described as appropriate.

The user terminal 10 mostly has the same configuration as the first exemplary embodiment. However, since the destination from which a user requests migration is the information management server 30, the process performed by the migration request unit 11 is slightly different as described below. The information management server 20 mostly has the same configuration as the first exemplary embodiment. However, since data migration is not requested from the user terminal 10, the reception processor 21 in the first exemplary embodiment is not necessary. In contrast, since the information management server 30 receives a data migration request from the user terminal 10, the information management server 30 has a configuration obtained by adding a reception processor 36. The reception processor 36 receives a data migration request from the user terminal 10 used by a user who wants to perform data migration.

Figure 13:
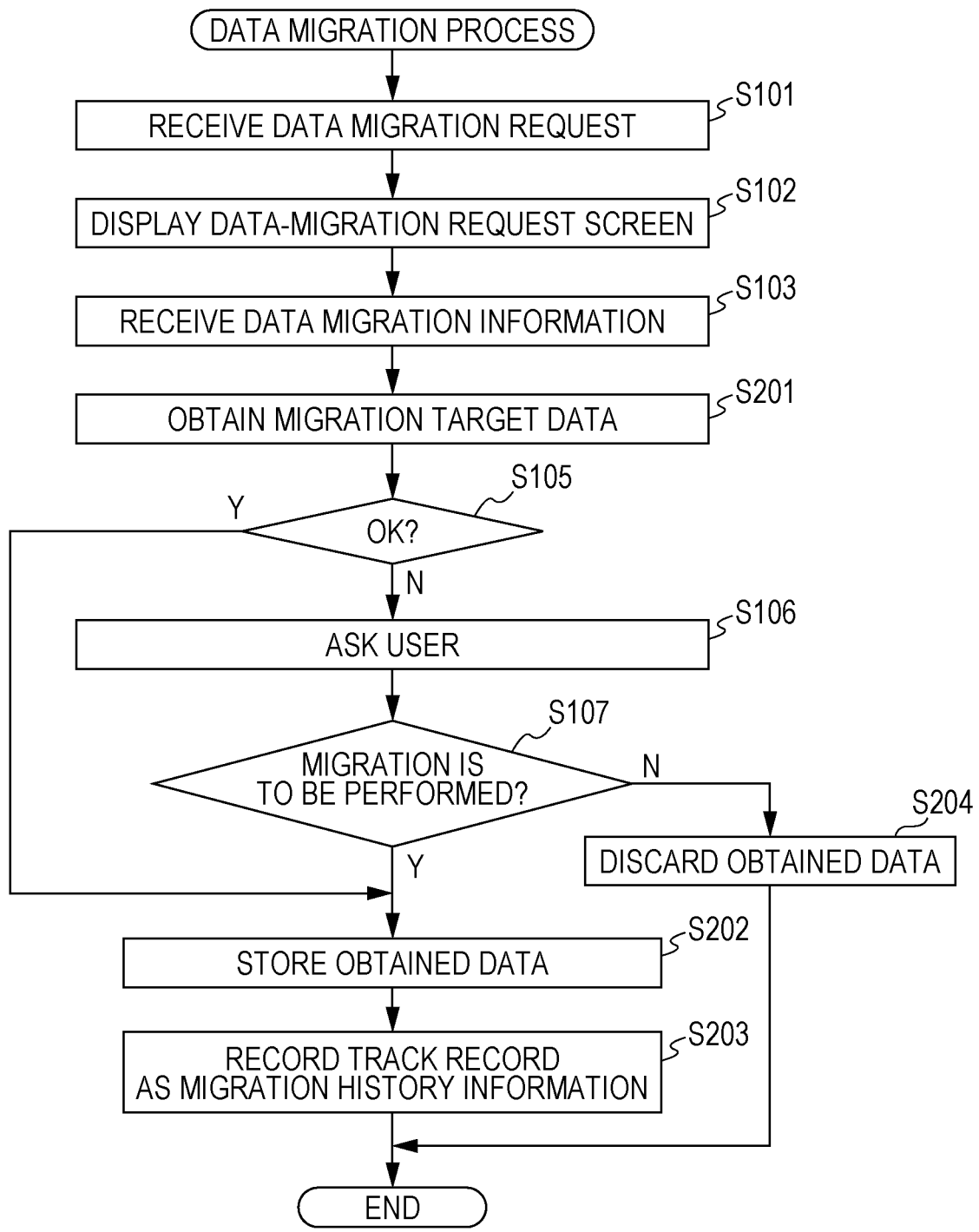
FIG. 13 is a flowchart of a data migration process performed by an information management server serving as a data migration destination, according to the second exemplary embodiment.

A data migration process performed by the information management server 30 which serves as the data migration destination will be described below by using the flowchart in FIG. 13. Processes similar to those in the first exemplary embodiment are designated with the same step numbers, and will not be described as appropriate.

A user who wants to perform data migration logs in to the information management server 30 serving as the new administrator that is to manage the user's own data. Through the login or a given operation performed after the login, data migration is requested from the current administrator.

Figure 14:
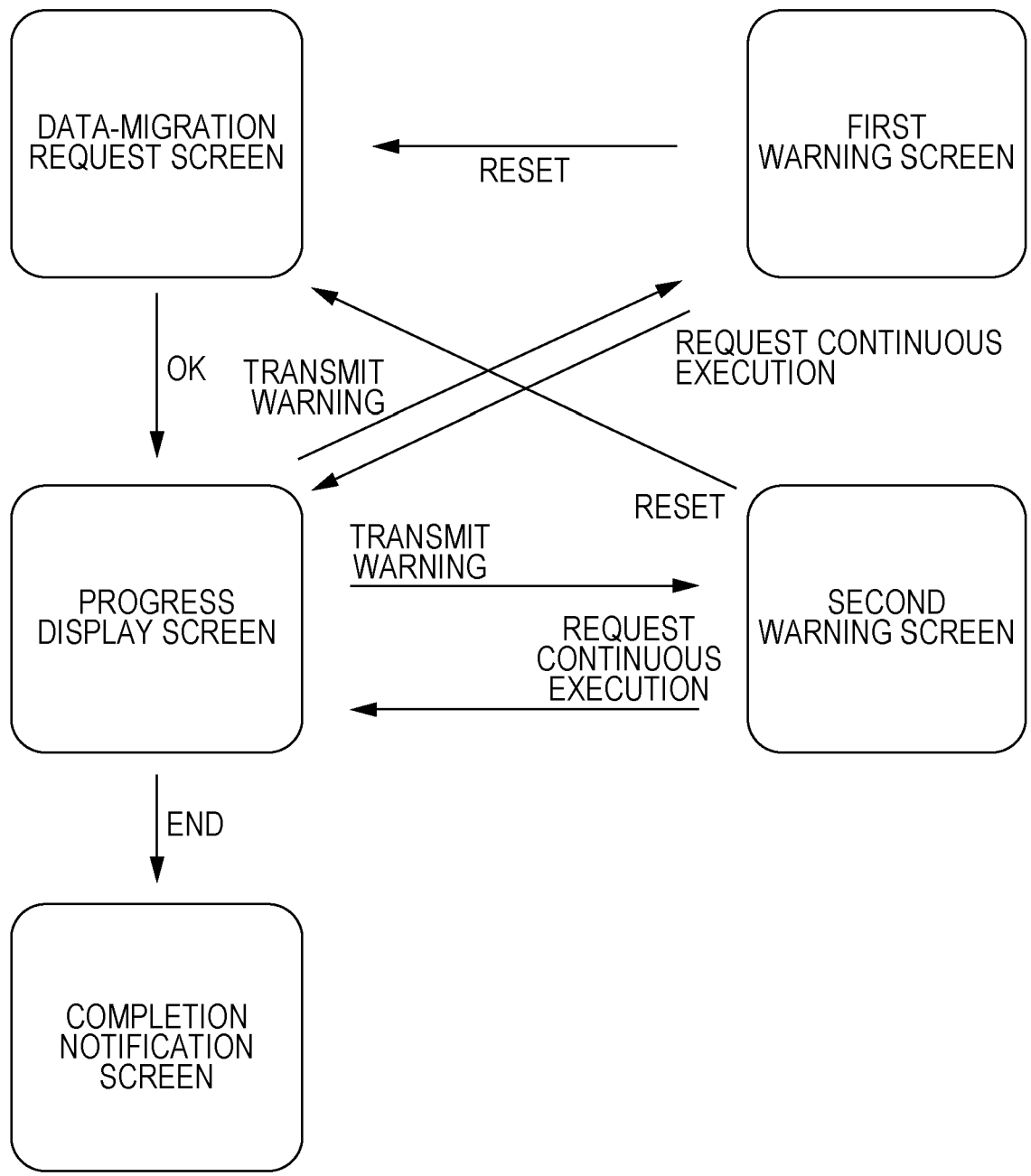
FIG. 14 is a diagram illustrating the transition relationship between screens displayed on a user terminal, according to the second exemplary embodiment.

When the reception processor 36 of the information management server 30 receives a data migration request from the user terminal 10 (step 101), the reception processor 36 causes the user terminal 10 to display the data-migration request screen illustrated in FIG. 15 (step 102). More specifically, the browser of the user terminal 10 processes the web page prepared by the information management server 30 so that the data-migration request screen is displayed. The same is true for screens other than the data-migration request screen. In the second exemplary embodiment, the display is switched from the data-migration request screen to several screens in a series in accordance with user operations. FIG. 14 illustrates the transition relationship between the screens which are switched from one to another.

The user sets, on the data-migration request screen, information for specifying the current administrator and information for specifying data acceptable to the new administrator. On the data-migration request screen illustrated in FIG. 15, account information, migration source information, and data information (desired data items) are displayed exemplarily. The account information includes information about the user which is specified when the user logs in to the information management server 30 (information specifying the user who wants to perform data migration). In the display example in FIG. 15, the account ID and the password (which may be hidden), which are specified in the login, and the user name are displayed.

The migration source information includes information about the data migration source (information specifying the current administrator). In the display example in FIG. 15, the company name is displayed as information specifying the data migration source (current administrator); the service name is displayed as information specifying a service using the data in the company; and account information (the account ID and the password) used in the login to the migration source is displayed. In addition, the file name used when the data obtained from the current administrator is stored in the information management server 30 is also classified as migration source information and is displayed. The migration source information is specified by the user. Through this specification, the data format acceptable to the new administrator is specified. As a matter of course, it is not necessary for the user to input all the migration source information. For example, when the user inputs and specifies a company name, similarly to the first exemplary embodiment, a list of the services provided by the company may be displayed in a pull-down menu or the like, and the user may select one of the services.

As the data information, the names of data items are displayed in a selectable manner. The user does not always grasp all of the data items stored in the information management server 20. Therefore, given data item names prepared in the information processing system may be displayed in a list. The user specifies, among the displayed data items, data items which the user wants to obtain from the information management server 20, or data items which the user wants the information management server 30 to manage.

After the user specifies necessary information, when the user selects the "Next" button on the data-migration request screen, the reception processor 36 receives, from the data-migration request screen, information specified by the user (step 103). The data acquisition unit 31 transmits a data acquisition request to the information management server 20 by specifying the account information of the migration source specified by the user. The data acquisition request includes the file data format and the data information (data items) which are set by the user on the data-migration request screen.

The data processor 22 of the information management server 20 serving as the data migration source obtains, from the data memory 25, the item data corresponding to the data items specified in the data acquisition request. The data processor 22 converts, when necessary, the data into the data format which is set by the user, and then transmits the resulting data to the information management server 30 as migration target data. Unlike the first exemplary embodiment, the information management server 20 does not receive a data migration request from the user. Therefore, even when item data to be migrated has inappropriate data, the user is not asked. Therefore, the information management server 20 transmits the migration target data to the information management server 30 without a preliminary check such as whether or not an item data associated with another person (for example, a photograph containing another person's face) is included.

Thus, the data acquisition unit 31 obtains the migration target data from the information management server 20 (step 201).

After the "Next" button is selected on the data-migration request screen, until acquisition of the data is completed, the data acquisition unit 31 causes the user terminal 10 to display a progress display screen. FIG. 16 illustrates an exemplary progress display screen. On the progress screen, a message indicating information about the process that is currently being performed, such as information indicating that the data is being obtained from the migration source or information indicating that the obtained data is being checked, is displayed. In addition, a predicted time needed until the process is completed is displayed.

The data acquisition unit 31 preliminarily checks each piece of item data included in the obtained data. If any item data included in the data is inappropriate (N in step 105), in the second exemplary embodiment, measures are taken by asking the user as described below (step 106).

When the data to be migrated includes item data associated with another person, the data acquisition unit 31 causes the user terminal 10 to display a first warning screen illustrated in FIG. 17 so that the user is asked about whether the data information (desired data items) included in the data is to be set again, or the data migration is continuously performed by excluding, from the migration targets, the item data associated with another person. If the user selects the former, that is, selects re-setting of the data information (N in step 107), under control of the controller 33, the data acquisition unit 31 discards the data obtained from the information management server 20 (step 204), and the reception processor 36 causes the user terminal 10 to display the data-migration request screen. If the user selects the latter, that is, selects continuous execution of the data migration, the data acquisition unit 31 deletes the item data, which is associated with another person, from the obtained data.

When the item data obtained from the information management server 20 includes item data that is not to be managed by the information management server 30 (item data that fails to be stored in the data memory 34 because the item data is not used in the provided service), the data acquisition unit 31 causes the user terminal 10 to display a second warning screen in FIG. 18 so that the user is asked about whether the data information (desired item data) included in the data is to be set again, or the data migration is continuously performed by excluding the item data, which fails to be stored, from the migration targets. If the user selects the former, that is, selects re-setting of the data information (N in step 107), under control of the controller 33, the data acquisition unit 31 discards the data obtained from the information management server 20 (step 204), and the reception processor 36 causes the user terminal 10 to display the data-migration request screen. If the user selects the latter, that is, selects continuous execution of the data migration, the data acquisition unit 31 deletes the item data, which fails to be stored, from the obtained data.

In addition, there may be item data which is not obtained because the item data is not stored in the information management server 20 although the user specifies the item data as an acquisition target on the data-migration request screen. In this case, the data acquisition unit 31 may cause the user terminal 10 to display a message indicating that there is such item data, for notification to the user.

If it is determined that the data to be migrated does not include inappropriate item data, and that the data is allowed to be migrated (Y in step 107), the data acquisition unit 31 stores the data in the data memory 34 (step 202). When the data acquisition unit 31 obtains the migration target data, the data acquisition unit 31 records track record information about the data migration, as the migration history information in the migration history information memory 35 (step 203). The data configuration of the migration history information is described in the first exemplary embodiment. The user's selection of re-setting of data information, that is, interruption of the data migration also may be recorded as the migration history information.

Thus, migration of the user's data is completed. When the data migration is completed, the completion notification unit 32 causes the user terminal 10 to display the data-migration completion notification screen in FIG. 9 so as to notify the user terminal 10 of successful termination of the data migration. Similarly to the first exemplary embodiment, after the user logs in to the information management server 30, the migrated-data confirmation screen in FIG. 10 may be displayed on the user terminal 10.

Figure 8:
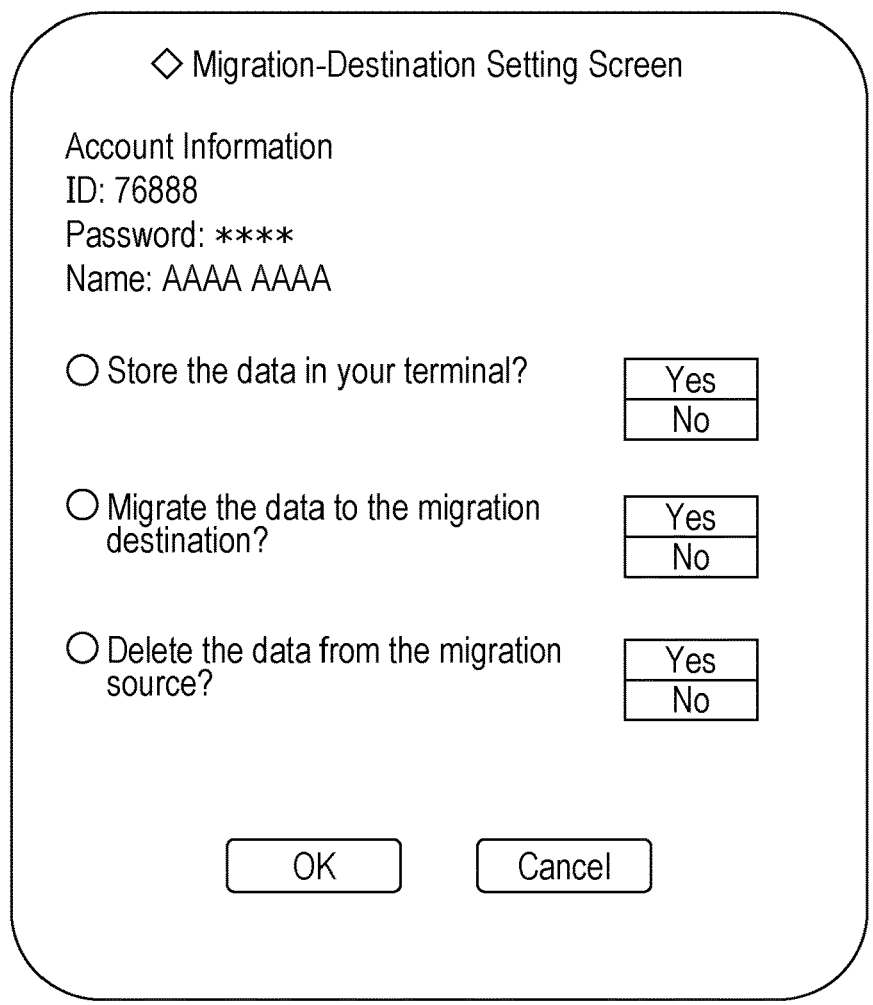
FIG. 8 is a diagram illustrating an exemplary migration-destination setting screen according to the first exemplary embodiment.

The second exemplary embodiment does not describe the user's specification of the following settings using the migration-destination setting screen in FIG. 8: acquisition of the migration target data via the user terminal 10 (including storage of the data in the user terminal 10); and deletion of the data from the information management server 20 serving as the migration source. However, similarly to the first exemplary embodiment, such settings may be made on the migration-destination setting screen. It is to be noted that the data stored in the user terminal 10, which is data obtained before the measures described in step 106 are taken against inappropriate item data, is not always the same as the data stored in the information management server 30. In order that the data stored in the user terminal 10 is to be the same as the data stored in the information management server 30, when the measures are taken against inappropriate item data, the process performed by the data acquisition unit 31 on the data obtained from the user terminal 10, that is, the process of deleting the inappropriate item data, needs to be performed also on the data stored in the personal data memory 14.

Also in the second exemplary embodiment, similarly to the first exemplary embodiment, a request to migrate data associated with multiple users may be received from a single user. However, in the case of the second exemplary embodiment, account information in the migration source also needs in order that which user account's data in the information management server 20 serving as the migration source is to be migrated is specified. Therefore, even when a single user requests migration of multiple users' data, the account information and the account information in the migration source information which are displayed on the data-migration request screen in FIG. 15 need to be set for each user. That is, even when a single user requests migration of multiple users' data, data migration needs to be requested for each user by using the data-migration request screen in FIG. 15. However, the migration source and the desired data items may be commonly set for the multiple users. FIG. 19 illustrates an exemplary data-migration request screen used in this case.

As described above, in the second exemplary embodiment, a user may request data migration from the information management server 30 serving as the migration destination.

In the exemplary embodiments described above, the description is made under the assumption that data to be migrated is personal data. However, data to be migrated is not necessarily limited to personal data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
 receive a data migration request submitted to a current administrator that manages data associated with a user;
 cause the user to specify: (i) a data item to be migrated to a new administrator, the data item being selected from data items included in the data; and (ii) a desired output format of the data item to be migrated to the new administrator;
 determine whether the data item specified by the user includes information that is associated with a person other than the user, the information that is associated with the other person being private information of the other person;
 when the data item includes the private information that is associated with the other person, cause the user to confirm whether the private information is to be excluded from the data item, and exclude the information from the data item if the user confirms that the private information is to be excluded;
 when an output format of the data item specified by the user is different from the desired output format of the data item to be migrated to the new administrator, convert the output format of the data item into the desired output format specified by the user; and
 in accordance with the data migration request, output the converted data item for migration to the new administrator serving as a data migration destination.

2. The information processing apparatus according to claim 1,
wherein the processor is further programmed to cause the user to set information for specifying information acceptable to the new administrator.

3. The information processing apparatus according to claim 1,
wherein the data migration is performed from the current administrator to the new administrator in such a manner that the data is output from the current administrator directly to the new administrator, or in such a manner that the data is output to the new administrator via a terminal apparatus used by the user.

4. The information processing apparatus according to claim 3,
wherein, when the new administrator is specified in the data migration request, the processor is further programmed to output the data directly to the new administrator.

5. The information processing apparatus according to claim 1,
wherein the processor is further programmed to obtain the output format appropriate for the new administrator from a memory in which an administrator is associated with the output format appropriate for the administrator.

6. The information processing apparatus according to claim 1,
wherein the processor is further programmed to receive, from a single user, the data migration request for data associated to each of a plurality of users.

7. The information processing apparatus according to claim 6,
wherein a corresponding new administrator serving as the migration destination of the data is capable of being set for each of the plurality of users, the data being associated with the user.

8. The information processing apparatus according to claim 1,
wherein the data associated with the user is private information of the user.

9. An information processing apparatus comprising:
a processor programmed to;
 receive a data migration request submitted to a new administrator serving as a migration destination of data associated with a user, the data being managed by a current administrator;
 cause the user to specify: (i) a data item to be migrated to the new administrator, the data item being selected from data items included in the data; and (ii) a desired output format of the data item to be migrated to the new administrator;
 determine whether the data item specified by the user includes information that is associated with a person other than the user, the information that is associated with the other person being private information of the other person;
 when the data item includes the private information that is associated with the other person, cause the user to confirm whether the information is to be excluded from the data item, and exclude the private information from the data item if the user confirms that the private information is to be excluded;
 when an output format of the data item specified by the user is different from the desired output format of the data item to be migrated to the new administrator, convert the output format of the data item into the desired output format specified by the user; and
 acquire the converted data item migrated from the current administrator in accordance with the data migration request.

10. The information processing apparatus according to claim 9,
wherein the processor is further programmed to ask the user about validity of the data migration request.

11. The information processing apparatus according to claim 9,
wherein the processor is further programmed to acquire the data to be migrated directly from the current administrator of the data associated with the user or from a terminal apparatus used by the user.

12. The information processing apparatus according to claim 9,
wherein the processor is further programmed to receive, from a single user, the data migration request for data associated with each of a plurality of users.

13. The information processing apparatus according to claim 12,
wherein a corresponding current administrator serving as the migration source of the data is capable of being set for each of the plurality of users, the data being associated with the user.

14. The information processing apparatus according to claim 9,
wherein the processor is further programmed to notify the user that the data migration from the current administrator has been completed.

15. The information processing apparatus according to claim 9, further comprising:
a memory that records a history describing that the data has been migrated from the current administrator.

16. The information processing apparatus according to claim 9,
wherein the data associated with the user is private information of the user.

17. An information processing system comprising:
a first information processing apparatus that is used by a current administrator that manages data associated with a user;
a second information processing apparatus that is used by a new administrator serving as a migration destination of data; and
a terminal apparatus that is used by the user,
wherein the first information processing apparatus includes a first processor programmed to:
receive a data migration request from the terminal apparatus;
cause the user to specify: (i) a data item to be migrated to the new administrator, the data item being selected from data items included in the data; and (ii) a desired output format of the data item to be migrated to the new administrator;
determine whether the data item specified by the user includes information that is associated with a person other than the user, the information that is associated with the other person being private information of the other person;
when the data item includes the private information that is associated with the other person, cause the user to confirm whether the private information is to be excluded from the data item, and exclude the information from the data item if the user confirms that the private information is to be excluded;
when an output format of the data item specified by the user is different from the desired output format of the data item to be migrated to the new administrator, convert the output format of the data item into the desired output format specified by the user; and
output the converted data item for migration to the second information processing apparatus or the terminal apparatus in accordance with the data migration request, and
wherein the second information processing apparatus includes a second processor programmed to acquire the converted data item migrated directly from the first information processing apparatus or via the terminal apparatus, the converted data item being output from the first information processing apparatus.

18. An information processing system comprising:
a first information processing apparatus that is used by a current administrator that manages data associated with a user;
a second information processing apparatus that is used by a new administrator serving as a migration destination of data; and
a terminal apparatus that is used by the user,
wherein the first information processing apparatus includes a first processor programmed to output the converted data item for migration to the second information processing apparatus or the terminal apparatus, and
wherein the second information processing apparatus includes a second processor programmed to:
receive a data migration request from the terminal apparatus;
cause the user to specify: (i) a data item to be migrated to the new administrator, the data item being selected from data items included in the data; and (ii) a desired output format of the data item to be migrated to the new administrator;
determine whether the data item specified by the user includes information that is associated with a person other than the user, the information that is associated with the other person being private information of the other person;
when the data item includes the private information that is associated with the other person, cause the user to confirm whether the private information is to be excluded from the data item, and exclude the information from the data item if the user confirms that the private information is to be excluded;
when an output format of the data item specified by the user is different from the desired output format of the data item to be migrated to the new administrator, convert the output format of the data item into the desired output format specified by the user; and
acquire the converted data item migrated directly from the first information processing apparatus or via the terminal apparatus in accordance with the data migration request, the converted data item being output from the first information processing apparatus.

19. A non-transitory computer readable medium storing a program causing a computer to execute a process comprising:
receiving a data migration request submitted to a current administrator that manages data associated with a user; and
causing the user to specify: (i) a data item to be migrated to a new administrator, the data item being selected from data items included in the data; and (ii) a desired output format of the data item to be migrated to the new administrator;
determining whether the data item specified by the user includes information that is associated with a person other than the user, the information that is associated with the other person being private information of the other person;
when the data item includes the private information that is associated with the other person, causing the user to confirm whether the information is to be excluded from the data item, and excluding the private information from the data item if the user confirms that the private information is to be excluded;
when an output format of the data item specified by the user is different from the desired output format of the data item to be migrated to the new administrator, converting the output format of the data item into the desired output format specified by the user; and in accordance with the data migration request, outputting the converted data item for migration to the new administrator serving as a data migration destination.

20. A non-transitory computer readable medium storing a program causing a computer to execute a process comprising:

receiving a data migration request submitted to a new administrator serving as a migration destination of data associated with a user, the data being managed by a current administrator;

causing the user to specify: (i) a data item to be migrated to the new administrator, the data item being selected from data items included in the data; and (ii) a desired output format of the data item to be migrated to the new administrator;

determining whether the data item specified by the user includes information that is associated with a person other than the user, the information that is associated with the other person being private information of the other person;

when the data item includes the private information that is associated with the other person, causing the user to confirm whether the information is to be excluded from the data item, and excluding the private information from the data item if the user confirms that the private information is to be excluded;

when an output format of the data item specified by the user is different from the desired output format of the data item to be migrated to the new administrator, converting the output format of the data item into the desired output format specified by the user; and acquiring the converted data item migrated from the current administrator in accordance with the data migration request.

* * * * *